United States Patent
Wen

(10) Patent No.: US 10,046,828 B2
(45) Date of Patent: Aug. 14, 2018

(54) BRAKE SYSTEM AND V-TYPE BRAKE

(71) Applicant: Yuan-Hung Wen, Chang Hua County (TW)

(72) Inventor: Yuan-Hung Wen, Chang Hua County (TW)

( * ) Notice: Subject to any disclaimer, the term of this patent is extended or adjusted under 35 U.S.C. 154(b) by 0 days.

(21) Appl. No.: 15/345,026

(22) Filed: Nov. 7, 2016

(65) Prior Publication Data

US 2017/0190380 A1 Jul. 6, 2017

(30) Foreign Application Priority Data

Dec. 30, 2015 (TW) .............................. 104144517 A

(51) Int. Cl.
*B62L 1/06* (2006.01)
*B62L 1/16* (2006.01)

(52) U.S. Cl.
CPC ...................................... *B62L 1/16* (2013.01)

(58) Field of Classification Search
CPC .... B62L 1/005; B62L 1/10; B62L 1/14; B62L 1/16
USPC .......... 188/24.19, 24.11, 24.16, 24.21, 24.22
See application file for complete search history.

(56) References Cited

U.S. PATENT DOCUMENTS

| 4,263,990 | A | * | 4/1981 | Yoshigai | ................. | F16D 65/46 |
| | | | | | | 188/24.19 |
| 5,503,252 | A | * | 4/1996 | Gelbein | .................. | B62L 1/005 |
| | | | | | | 188/24.19 |
| 5,960,913 | A | * | 10/1999 | Kuo | .......................... | B62L 1/14 |
| | | | | | | 188/24.12 |
| 6,039,153 | A | * | 3/2000 | Sugimoto | ............... | B62L 1/005 |
| | | | | | | 188/24.19 |
| 6,109,397 | A | * | 8/2000 | Chen | ........................ | B62L 1/14 |
| | | | | | | 188/24.12 |
| 2004/0011598 | A1 | * | 1/2004 | Hermansen | ............. | B62L 1/005 |
| | | | | | | 188/24.21 |
| 2016/0090148 | A1 | * | 3/2016 | Yang | ........................ | B62L 1/10 |
| | | | | | | 188/24.19 |

FOREIGN PATENT DOCUMENTS

TW 273784 4/1996

* cited by examiner

*Primary Examiner* — Pamela Rodriguez
(74) *Attorney, Agent, or Firm* — Muncy, Geissler, Olds & Lowe, P.C.

(57) ABSTRACT

A V-type brake is provided for being assembled on a bicycle, the bicycle including two fork arms and a wheel set which is assembled between the two fork arms, the V-type brake including: two brake swing arms, respectively for being pivotably assembled on the two fork arms toward the wheel set, each said brake swing arm having a connecting portion; two brake pad assemblies, respectively assembled on the two brake swing arms, each said brake pad assembly having an assembling slot, the assembling slot positionably and slidably arranged within the connecting portion. A brake system is further provided, including the V-type brake mentioned above, further including a cable assembly, the cable assembly connected to the two brake swing arms, the cable assembly being operable to drive the two brake swing arms and the two brake pad assemblies to swing toward the wheel set.

10 Claims, 5 Drawing Sheets

BRAKE SYSTEM AND V-TYPE BRAKE

BACKGROUND OF THE INVENTION

Field of the Invention

The present invention relates to a brake, and more particularly to a brake system and a V-type brake.

Description of the Prior Art

A structure of a common brake as disclosed in TW273784 at least includes a main body, a brake pad, a barrel and two assembling blocks, a bolt is screwed with one of the two assembling blocks, the main body, the other of the two assembling blocks and the barrel, and a user can screw the bolt to adjust a tightness of the brake.

However, the brake pad is fixed through screwing the bolt, the brake pad is easily rotatable about the bolt, and the brake pad may have frictional contact with a wheel set during braking and deflect and disengaged from a predetermined position to make the brake malfunction. Therefore, how to approve an assembly of the brake and adjust the structure for the user to assemble and adjust the brake conveniently is a goal that the industry needs to work toward.

The present invention has arisen to mitigate and/or obviate the afore-described disadvantages.

SUMMARY OF THE INVENTION

The major object of the present invention is to provide a brake system and a V-type brake which can be fixedly assembled so as to stabilize a braking function and elevate the safety of riding a bicycle. In addition, the brake system and the V-type brake can be movable and adjustable so that it is convenient for a user to assemble and disassemble the brake system and V-type brake, and a brake pad is stably assembled and is not easily detachable.

To achieve the above and other objects, a V-type brake is provided for being assembled on a bicycle, the bicycle including two fork arms and a wheel set which is assembled between the two fork arms, the V-type brake including: two brake swing arms, respectively for being pivotably assembled on the two fork arms and swingable toward the wheel set, each said brake swing arm having a connecting portion; two brake pad assemblies, respectively assembled on the two brake swing arms, each said brake pad assembly having an assembling slot, the assembling slot positionably and slidably arranged within the connecting portion.

To achieve the above and other objects, a brake system is further provided, including the V-type brake mentioned above, further including a cable assembly, the cable assembly connected to the two brake swing arms, the cable assembly being operable to drive the two brake swing arms and the two brake pad assemblies to swing toward the wheel set.

The present invention will become more obvious from the following description when taken in connection with the accompanying drawings, which show, for purpose of illustrations only, the preferred embodiment(s) in accordance with the present invention.

DETAILED DESCRIPTION OF THE PREFERRED EMBODIMENTS

Figure 1:
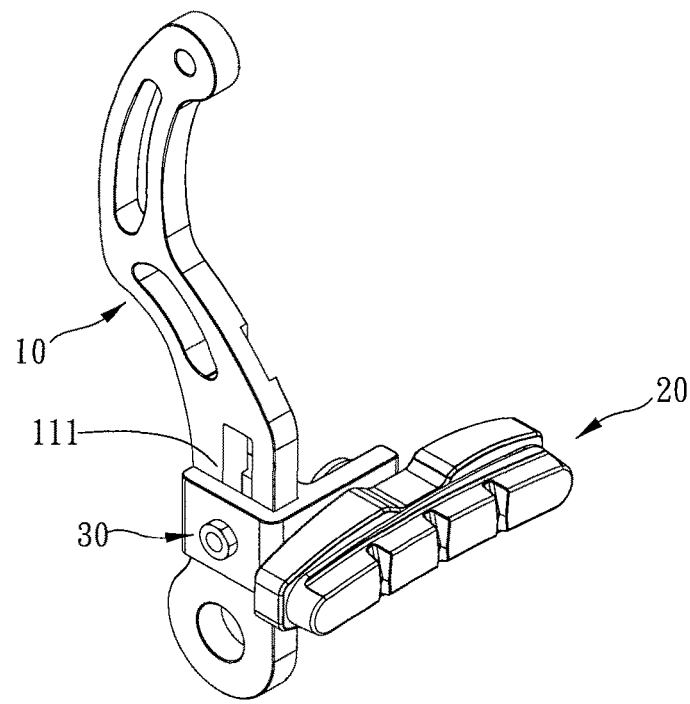
FIG. 1 is a drawing of a first preferred embodiment of the present invention.
Figure 2:
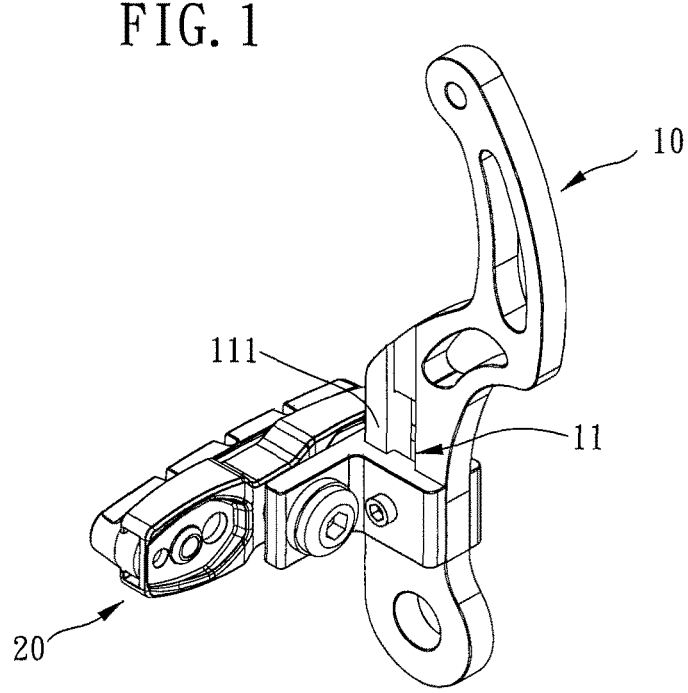
FIG. 2 is another drawing of the first preferred embodiment of the present invention.
Figure 3:
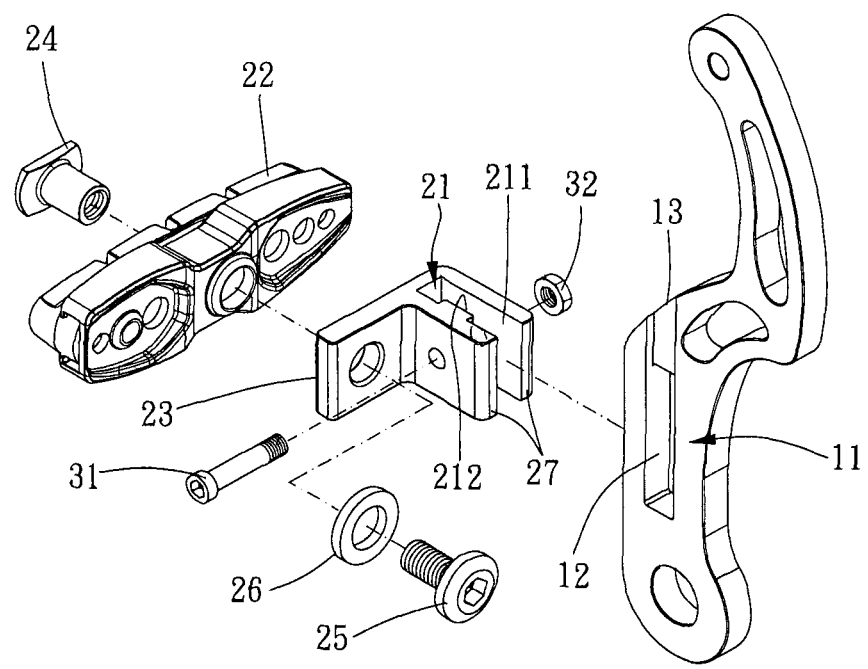
FIG. 3 is a breakdown view of the first preferred embodiment of the present invention.
Figure 4:
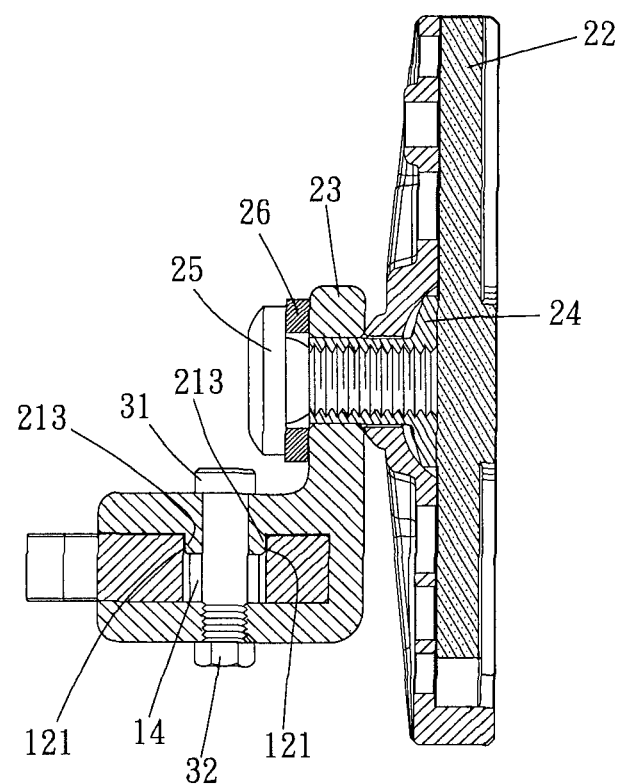
FIG. 4 is a cross-sectional view of the first preferred embodiment of the present invention.

The present invention will be clearer from the following description when viewed together with the accompanying drawings, which show, for purpose of illustrations only, the preferred embodiment in accordance with the present invention.

Please refer to FIGS. 1 to 5 for a first preferred embodiment of the present invention. A V-type brake 1 is for being assembled on a bicycle, the bicycle includes two fork arms and a wheel set which is assembled between the two fork arms, and the V-type brake 1 includes two brake swing arms 10 and two brake pad assemblies 20.

The two brake swing arms 10 are respectively for being pivotably assembled on the two fork arms and swingable toward the wheel set, the wheel set may be a front wheel or a rear wheel, each said brake swing arm 10 has a connecting portion 11, the two brake pad assemblies 20 are respectively assembled on the two brake swing arms 10, each said brake pad assembly 20 has an assembling slot 21, and the assembling slot 21 is positionably and slidably arranged within the connecting portion 11.

Specifically, the brake pad assembly 20 includes a brake pad 22 and an assembling member 23, the assembling member 23 has the assembling slot 21, the assembling member 23 is substantially L-shaped, and the brake pad 22 is connected with the assembling member 23. More specifically, the brake pad assembly 20 further includes a first screwed member 24, a second screwed member 25 and a washer 26, the first screwed member 24 is arranged on the brake pad 22, the washer 26 is sleeved on the second screwed member 25, one of two ends of the second screwed member 25 is disposed through a first end of the assembling member 23 and screwed with the first screwed member 24 to fixedly connect the brake pad 22 and the assembling member 23, and the washer 26 is sandwiched between the second screwed member 25 and the assembling member 23. The brake pad 22 is for frictional contact with the wheel set to brake, and the brake pad 22 is stably assembled on the assembling member 23 to make the brake pad 22 uneasily detached from the assembling member 23.

The assembling member 23 is engaged with the brake swing arm 10, more specifically, a second end of the assembling member 23 extends to form two protrusive walls 27, the two protrusive walls 27 define the assembling slot 21, and the two protrusive walls 27 are on two opposite sides of the brake swing arm 10. In this embodiment, the assembling slot 21 is formed through the brake pad assembly 20 along a first direction, as viewed along the first direction, the assembling slot 21 is substantially U-shaped, the assembling slot 21 positionably receives the connecting portion 11, the connecting portion 11 has two abutting faces 111 lateral to the first direction, and the two abutting faces 111 respectively abut against two inner walls 211 of the assembling slot 21 so as to fixedly connect the assembling slot 21 and the connecting portion 11.

At least one of the two abutting faces of the connecting portion 11 has a sliding connecting slot 12 recessed thereon, the inner wall 211 of the assembling slot 21 corresponding to the sliding connecting slot 12 has a protrusion 212, and the protrusion 212 is positionably and slidably engaged with the sliding connecting slot 12. More specifically, the sliding connecting slot 12 is lateral to an axial direction of the wheel set, the protrusion 212 is substantially rectangular, the protrusion 212 extends along the first direction to form two sliding planes 213, the two sliding planes 213 extend in parallel, the sliding connecting slot 12 extends along the first direction to form two sliding walls 121, and the two sliding planes 213 are connected to the two sliding walls 121 correspondingly respectively so that the protrusion 212 is positionably slidable along the sliding connecting slot 12. More specifically, through the protrusion 212 and the sliding connecting slot 12 slidably connected to each other, the brake pad assembly 20 is movable and adjustable relative to the brake swing arm 10 and is convenient to be adjusted.

The sliding connecting slot 12 extends toward a direction and has an opening 13 on a side of the brake swing arm 10, a span of the opening 13 is substantially equal to a distance between the two sliding planes 213, and in actual practice, the protrusion 212 can directly slide through the opening 13. More specifically, when a user assembles the brake pad assembly 20 and the brake swing arm 10, the user can sleeve the brake pad assembly 20 through the opening 13 to the brake swing arm 10, and the brake pad assembly 20 can be positionably and slidably engaged with the brake swing arm 10 through the above-mentioned way. Similarly, when the user disassembles the brake pad assembly 20, the brake pad assembly 20 slides from the opening 13 directly and out through the brake swing arm 10 so that it is easy for the user to assemble or disassemble the brake pad assembly 20.

The V-type brake 1 further includes two fixing assemblies 30, and each said fixing assembly 30 is connected to one said assembling member 23 and one said brake swing arm 10. For example, the brake swing arm 10 has a through hole 14, the fixing assembly 30 includes a bolt 31 and a nut 32, the bolt 31 is disposed through the assembling slot 21 and the through hole 14, one of two ends of the bolt 31 abuts against a side of the assembling member 23, the other of the two ends of the bolt 31 is screwed with the nut 32, the nut 32 abuts against the other side of the assembling member 23, and the bolt 31 and the nut 32 releasably clamp the brake pad assembly 20 and the brake swing arm 10 so that the user can fix the brake pad assembly 20 and the brake swing arm 10 through screwing the bolt 31 and the nut 32, and when the bolt 31 and the nut 32 loose from each other, the brake pad assembly 20 is movable and adjustable relative to the brake swing arm 10.

It is to be noted that the assembling slot 21 and the connecting portion 11 are stably assembled to each other through the two abutting faces 111 abutting against the two inner walls 211; and the brake pad 20 and the brake swing arm 10 are stably assembled to each other through the fixing assembly 30 so as to elevate a stability of the V-type brake 1.

Figure 6:
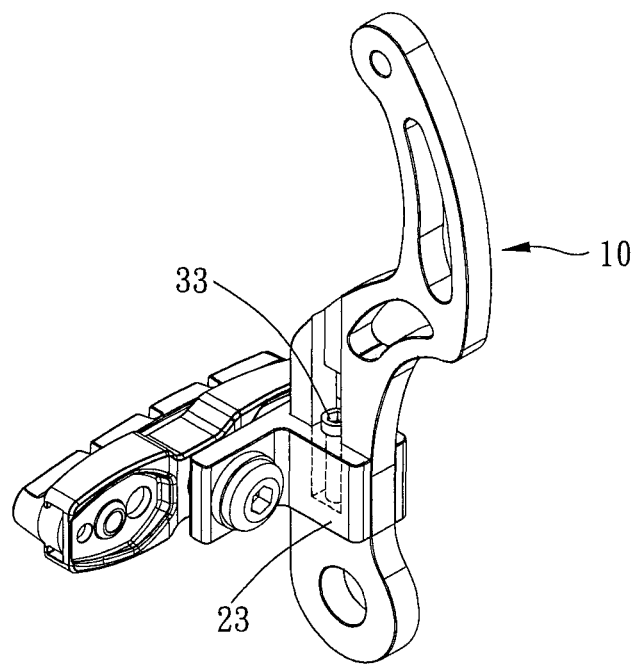
FIG. 6 is a drawing of a second embodiment of the present invention.
Figure 7:
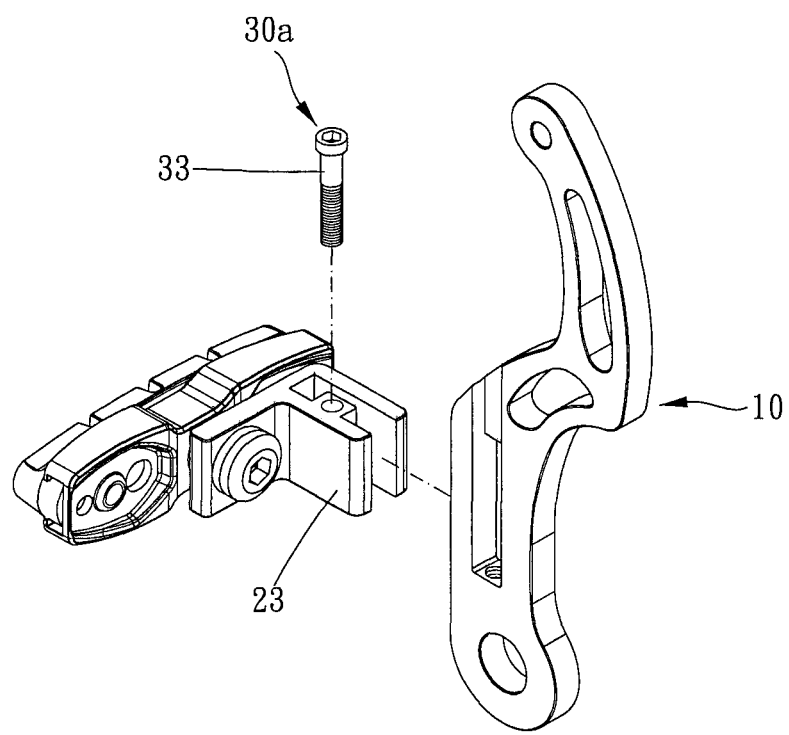
FIG. 7 is a breakdown view of the second embodiment of the present invention.

Please refer to a second embodiment of FIGS. 6 and 7, a fixing assembly 30a includes a screwing member 33, the screwing member 33 is disposed through the assembling member 23 along the first direction, one of two ends of the screwing member 33 abuts against the assembling member 23, the other of the two ends of the screwing member 33 is screwed with the brake swing arm 10, and the screwing member 33 is screwed with the brake swing arm 10 to fixedly connect the assembling member 23 and the brake swing arm 10.

Figure 5:
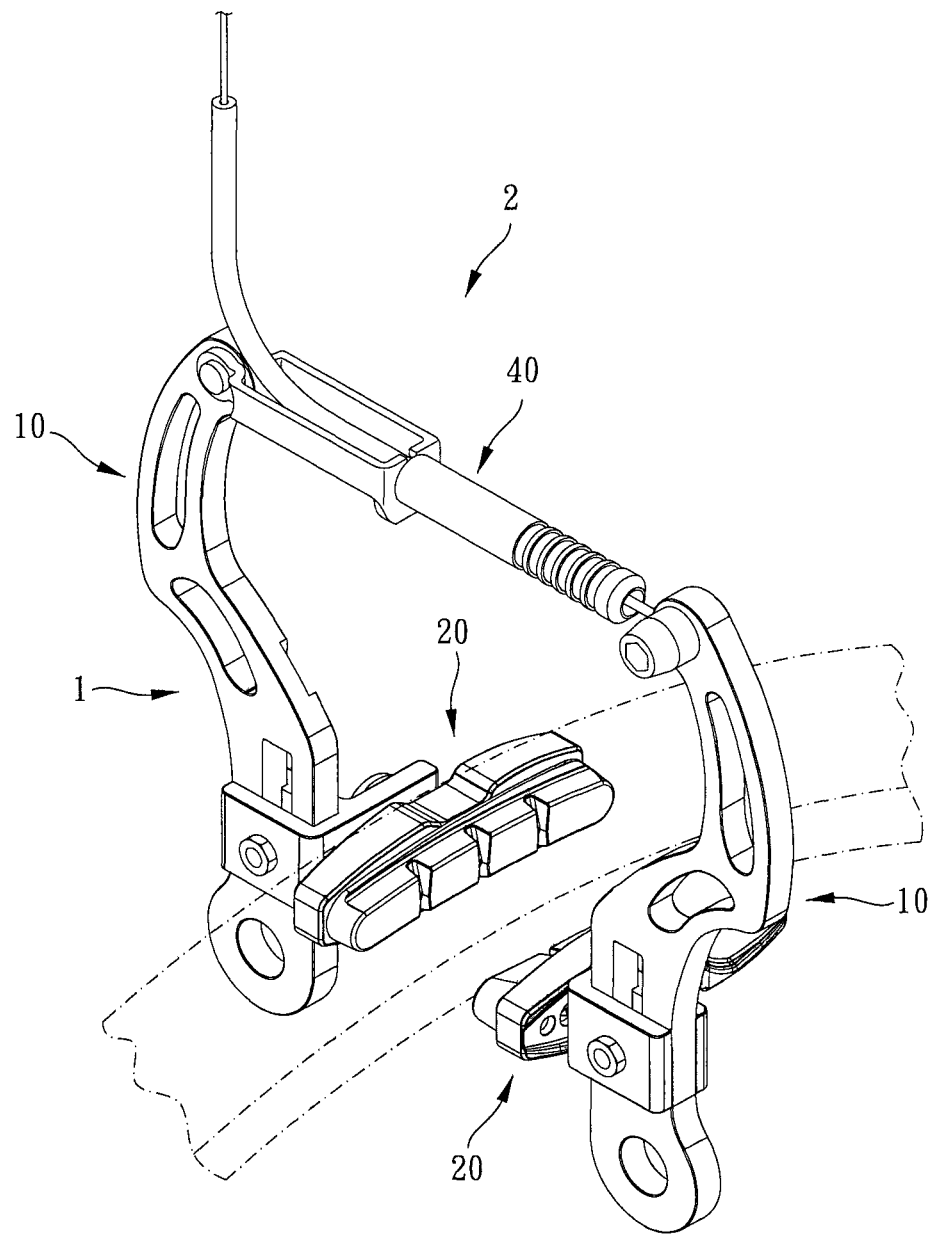
FIG. 5 is a drawing of first preferred embodiment of the present invention in use.

Please further refer to FIG. 5, a brake system 2 is further provided, including the V-type brake 1 mentioned above, further including a cable assembly 40. The cable assembly 40 is connected to the two brake swing arms 10, the cable assembly 40 is operable to drive the two brake swing arms 10 and the two brake pad assemblies 20 to swing toward the wheel set, and the user can operate the cable assembly 40 to drive the brake pad assembly 20 to have frictional contact with the wheel set to brake.

Given the above, the brake system and the V-type brake can be fixedly assembled so as to stabilize a braking function and elevate the safety of riding the bicycle. In addition, the brake system and the V-type brake can be movable and adjustable so that it is convenient for the user to assemble and disassemble the brake system and V-type brake, and the brake pad is stably assembled and is not easily detachable.

While we have shown and described various embodiments in accordance with the present invention, it should be clear to those skilled in the art that further embodiments may be made without departing from the scope of the present invention.

What is claimed is:

1. A V-type brake, for being assembled on a bicycle, the bicycle including two fork arms and a wheel set which is assembled between the two fork arms, the V-type brake including:
    two brake swing arms, respectively for being pivotably assembled on the two fork arms and swingable toward the wheel set, each said brake swing arm having a connecting portion;
    two brake pad assemblies, respectively assembled on the two brake swing arms, each said brake pad assembly having an assembling slot, each assembling slot positionably and slidably arranged within each connecting portion;
    wherein each assembling slot is formed through each brake pad assembly along a first direction, the first direction is parallel to a radial direction of the wheel set, and each connecting portion has a sliding connecting slot which elongately extends along the first direction and is open upwardly;
    wherein one of two inner walls of each assembling slot corresponding to each sliding connecting slot has a protrusion, and each protrusion is non-rotatably abutted against two sliding walls of each sliding connecting slot which extend along the first direction.

2. The V-type brake of claim 1, wherein each brake pad assembly includes a brake pad and an assembling member, each brake pad is connected with each assembling member, each assembling member is assembled to each brake swing arm, each brake pad is for frictional contact with the wheel set, each assembling member is substantially L-shaped, and each assembling member has each assembling slot.

3. The V-type brake of claim 2, wherein as viewed along the first direction, each assembling slot is substantially U-shaped, each assembling slot positionably receives each connecting portion, and each connecting portion has two abutting faces which are lateral to the first direction and respectively abut against the two inner walls of each assembling slot.

4. The V-type brake of claim 3, wherein each protrusion is positionably and slidably engaged with each sliding connecting slot along the first direction.

5. The V-type brake of claim 4, wherein each sliding connecting slot extends toward a direction and has an opening on a side of each brake swing arm, each protrusion extends along the first direction to form two sliding planes, the two sliding planes correspond to and contact each of the two sliding walls respectively, each sliding connecting slot is lateral to an axial direction of the wheel set, each protrusion is substantially rectangular, each of the two sliding planes extend in parallel, and a span of each opening is substantially equal to a distance between each of the two sliding planes.

6. The V-type brake of claim 3, further including two fixing assemblies, each said fixing assembly is connected to one of said assembling members and one of said brake swing arms.

7. The V-type brake of claim 6, wherein each brake swing arm has a through hole, each fixing assembly includes a bolt and a nut, each bolt is disposed through each assembling slot and each through hole, one of two ends of each bolt abuts against a side of each assembling member, the other of the two ends of each bolt is screwed with each nut, each nut abuts against the other side of each assembling member, and each bolt and each nut releasably clamp each brake pad assembly and each brake swing arm.

8. The V-type brake of claim 6, wherein each fixing assembly includes a screwing member, each screwing member is disposed through each assembling member along the first direction, one of two ends of each screwing member abuts against each assembling member, the other of the two ends of each screwing member is screwed with each brake swing arm, and each screwing member is screwed with the each brake swing atm to fixedly connect the each assembling member and each brake swing arm.

9. The V-type brake of claim 3, wherein each brake pad assembly further includes a first screwed member, a second screwed member and a washer, each first screwed member is arranged on each brake pad, each washer is sleeved on each second screwed member, one of two ends of each second screwed member is disposed through a first end of each assembling member and screwed with each first screwed member to fixedly connect each brake pad and each assembling member, each washer is sandwiched between each second screwed member and each assembling member, a second end of each assembling member extends to form two protrusive walls, each of the two protrusive walls define each assembling slot, and each of the two protrusive walls are on two opposite sides of each brake swing arm.

10. A brake system, including the V-type brake of claim 1, further including a cable assembly, the cable assembly connected to the two brake swing arms, the cable assembly being operable to drive the two brake swing arms and the two brake pad assemblies to swing toward the wheel set.

* * * * *